METHOD OF ASSEMBLING SEMICONDUCTOR UNITS

Filed Feb. 27, 1952

INVENTOR.
GARRETT D. BOWNE III
BY Paul S. Martin
ATTORNEY 2,699,594

METHOD OF ASSEMBLING SEMICONDUCTOR UNITS

Garrett D. Bowne III, Marblehead, Mass., assignor to Sylvania Electric Products Inc., a corporation of Massachusetts Application February 27, 1952, Serial No. 273,699

3 Claims. (Cl. 29—25.3)

The present invention relates to the manufacture of semiconductor translators, and particularly to those having a glass envelope containing a semiconductor element and its contacts in a hermetically sealed enclosure.

The desirability of a glass hermetically sealed container for such devices has been recognized, and effective sealed diodes are described in several patent applications co-pending herewith, including Serial No. 74,768 filed by Collins on February 5, 1949, and Serial No. 85,518 filed by Paul Gates on April 5, 1949. The envelope or container is relied on to support the semiconductor element and its contact and fixed critically adjusted pressure contact, and to afford protection against atmospheric attack on the semiconductor. The methods and the products there described represent notable achievements in commercial point-contact diode production. In these applications, a number of operations are required at the seal of each of the terminal leads respectively for the semiconductor body and for the contact wire or whisker. This inherently reflects in high manufacturing cost; and losses or shrinkage may occur at each operation thus further reflecting high cost.

A separate metal tube or eyelet is used at each end of a length of glass tubing in those applications. A glass-to-metal seal is formed between the eyelet and the glass tubing in one operation and, in a later operation, a hermetic seal is formed between the metal eyelet and the lead extending through that eyelet. The metal-to-metal seal between each eyelet and each terminal lead entails the use of a flux and solder which creates the problem of corrosive salts entering the envelope, that might attack the semiconductor and in this way impair the quality and life of the resulting unit.

An object of the present invention is to produce a glass enclosed semiconductor translator, especially a diode, in a procedure in which a minimum number of operations are required. Another object is to provide a semiconductor translator such as a diode, in which the envelope is wholly of glass and in which no corrosive reagent is required in the sealing operation.

It has also been shown that an enclosure wholly of glass can be formed by sealing glass envelope parts to the terminal leads to which diode elements are to be secured (see co-pending application Serial No. 80,358 filed March 9, 1949, by Paul E. Gates). This involves difficult handling of glass and metal shapes during sub-assembly operations, and the imposition of dimensional tolerances difficult to hold in glass-working, considerations that complicate mechanization of the production. A further object of this invention is to minimize this sort of difficulty in the manufacture of glass-enclosed semiconductor devices.

Viewed more directly the purpose of the present invention is to devise a new and effective method of manufacture of diodes in respect to the assembly and forming of the supporting sealed enclosure for a semiconductor body and its contacts. An additional object of the invention is to form a diode by processes particularly suited to the formation of a glass enclosed translator of extremely small size. Further features of novelty and objects of the invention will be apparent from the following detailed disclosure of an illustrative embodiment shown in the accompanying drawings. In these drawings.

Figure 1:
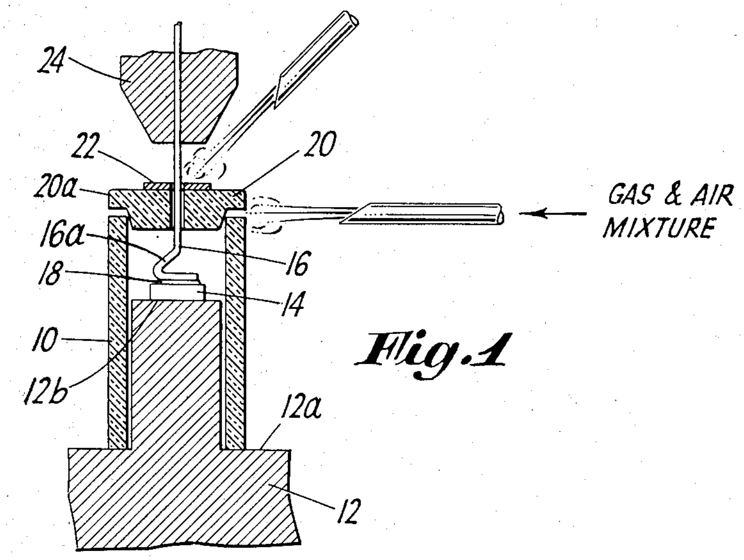
Figure 1 is a greatly enlarged diagrammatic view of a step in a manufacture of an illustrative germanium diode.

In Figure 1, a number of parts are shown assembled, preparatory to the first operation. The step illustrated is described in connection with crystalline, doped germanium as the semiconductor element of the diode to be fabricated. This material is reputed to be particularly sensitive to damage by heat. The method has other applications as with crystals of silicon and the like.

A length of glass tubing 10 is shown assembled on a mandrel 12, having a shoulder **12*a* supporting the lower end of glass tube 10, and having an upper shoulder 12*b* against which a germanium body 14 is supported. In a preliminary operation, the carefully prepared germanium body 14 is soldered at area contact 18 or otherwise conductively and mechanically secured to a wire 16 as of dument or other material that is adapted to form a seal with glass. The wire is formed with a bend 16*a* that affords a transverse base to which the germanium is effectively soldered. In the present form, a substantial length of this wire is intended to be enclosed in the completed envelope and the separation between the germanium crystal 14 and the ultimate glass seal is such as to provide sufficient thermal isolation between the end seal and the crystal itself. The length of wire required is minimized by selecting a wire of small cross-section and by flattening the wire in the region of the bend; and when this is used either a heat insulator or a good heat conductor can be used as the mandrel 12; but where the wire is of substantial cross section and there is not very great heat isolation between the crystal and the glass sealing region, the mandrel 12** should be of a heat insulator such as lava in order not to chill the wire excessively at the seal during the sealing operation.

Wire lead 16 supporting the germanium crystal 14 is threaded through a ring 20 molded of low-temperature-melting glass. It is desirable that the bore of glass tubing 10 be proportioned in relation to the pre-molded ring 20, so as to have that ring extend a short distance into the glass tubing but to be supported by the glass tubing as shown before the sealing operation commences; and it is also desirable that this glass premold should have a flange **20*a* for providing glass stock extending across the end of the glass tubing in such a way as to seal to the end of that glass tubing when heat is developed. Additionally a metal ring 22 is disposed on the glass form 20 for a purpose to be described. This assembly of wire 16, glass form 20, and metal ring 22 are supported in a chuck 24 which centers the wire coaxially with the glass tube 10. Thereafter, the end of glass tube 10 is heated with localized flames, together with the metal ring 22 and wire 16, thereby heating the pre-mold 20 to fusing temperature quickly. This quickly completes the seal of the envelope between the end of glass tubing 10 and glass portion 20 (which forms the end wall of the envelope), and in the same operation forming the glass-to-metal seal between portion 20 and wire 16. The chuck and mandrel are rotated about their common axis during this operation for uniform heating around the seal. Mandrel 12 is effective to cool the germanium body 14 during the sealing operation but the temperature gradient along the wire is such that the temperature of the wire in the region of the seal can be raised for effective glass-to-metal sealing. The premold glass has a melting temperature in the region of 450 to 500° centigrade, much lower than that of glass tube 10**.

Figure 2:
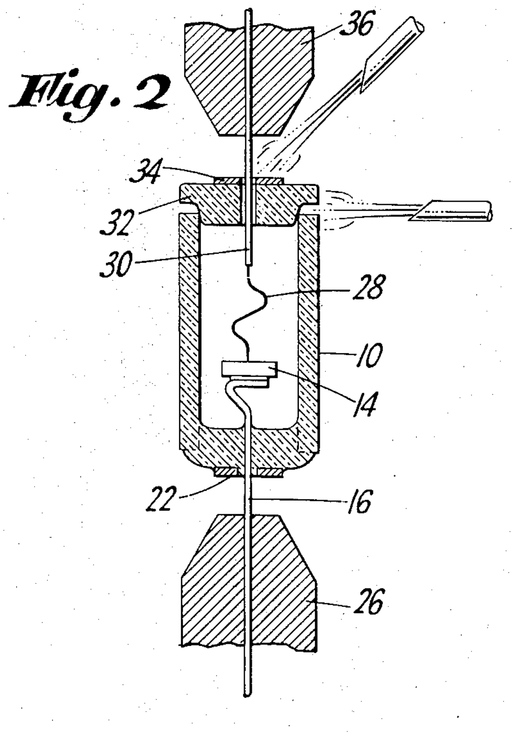
Figure 2 is a similar view of the final step in the assembly of an illustrative germanium diode.

The unit formed in the operation illustrated by Figure 1 can be used variously as in diodes and in other devices in which such shape may be desirable. In Figure 2 the unit thus formed is shown supported by chuck 26 in condition for completing a diode by assembling against crystal 16 a sharp contact 28 as of tungsten wire. Wire 28 is carried by a dument wire 30 or other suitable glass-sealing wire and on this is threaded a molded glass ring 32 identical to ring 20 and a metal ring 34 identical to ring 22. Chuck 36 supports wire 30 so that wire 28 is in proper pressure contact with body 14. Chucks 36 and 26 are electrically insulated apart so that these may be energized for electrically pulsing and testing the unit being finally sealed together. When the electrical properties are established according to desired standards, suitable heating, as by the flames illustrated, is applied to fuse the soft-glass pre-mold to the end and to the inside bore of glass tube 10 and to seal to wire 30 in critically established contact with body 14. Chucks 26 and 36 are rotated during this operation where the flames shown are used.

This completes the hermetic enclosure in the same operation which also forms the glass-to-metal seal between the glass element 32 constituting the end of the envelope and the wire 30; and in the same operation the end of the envelope is sealed to the glass tube 10. Wire 30 and whisker 28 are handled easily in premliminary processing operations and during the final sealing step without any encumbrance such as is represented by a glass form sealed to wire 30 in a preliminary operation.

Figure 3:
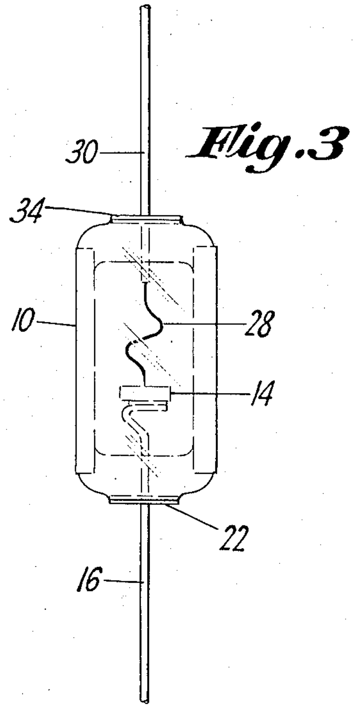
Figure 3 is a view of an illustrative completed diode made by the process of Figures 1 and 2.

A completed unit according to the steps of Figures 1 and 2 is shown in Figure 3. Metal rings 22 and 34 are seen to be sealed to the ends of the envelope and serve to prevent stress produced by deflection of the projecting wires from being transmitted through the soft glass end portions.

Typically, the unit of Figure 3 is of approximately ⅛ inch outside diameter and leads 16 and 30 are of .020 inch diameter. The overall length between the glass rings 22 and 34 is ¼ inch, and the size of the semiconductor body 16 is about .040 inch square.

The foregoing illustrative disclosure represents a specific exemplary application of various aspects of the invention, but other applications thereof and variations in detail will occur to those skilled in the art, wherefore a latitude of interpretation should be accorded to the appended claims, consistent with the spirit and scope of the invention.

What is claimed is:

1. The method of fabricating a diode hermetically sealed in a glass envelope, including the steps of sealing a terminal wire joined to a semiconductor to a low-melting glass ring and simultaneously sealing the glass ring to the end of a higher-melting glass tube with the semiconductor disposed within the tube; assembling a resilient sharp contact carried by a second terminal lead in critical pressure contact with the semiconductor; and sealing a low-melting glass ring simultaneously to the second terminal lead and to the remaining end of the glass tube while maintaining the assembled critical pressure contact.

2. The method of fabricating a diode hermetically sealed in a glass envelope, including the steps of preparing a first subassembly including a semiconductor element carried within a generally cylindrical glass container on a terminal lead sealed in and extending through one end of the container and with the opposite end of the container remaining open; assembling a resilient sharp contact element carried by a second terminal lead in critical pressure contact with the semiconductor element; and while maintaining such contact sealing a low-melting glass ring simultaneously to the second terminal lead and across the open end of said container thereby to complete a glass envelope enclosing the elements and holding those elements in critical contact with each other.

3. The method of fabricating an electrical translator hermetically enclosed in a glass envelope, said translator having a semiconductor element in engagement with a sharp contact element, which method includes the steps of preparing a first subassembly including one of said elements carried by a terminal lead sealed in and extending through one end of a generally cylindrical container with said one element inside the container and with an open end of the container opposite said terminal lead, assembling another translator element carried by a second terminal lead in critical pressure contact with said one element, and while maintaining such contact sealing a low-melting glass ring simultaneously to the second terminal lead and across the open end of said container thereby to complete a hermetically sealed glass envelope enclosing the translator elements and holding those elements in critical contact with each other.

References Cited in the file of this patent

UNITED STATES PATENTS

| | | |
|---|---|---|
| 2,125,315 | Ronci | Aug. 2, 1938 |
| 2,499,854 | Ellefson | Mar. 7, 1950 |
| 2,572,993 | Douglas et al. | Oct. 30, 1951 |
| 2,595,475 | McLaughlin | May 6, 1952 |
| 2,598,241 | Elenbaas et al. | May 27, 1952 |
| 2,626,985 | Gates | Jan. 27, 1953 |